(12) United States Patent
Aslam

(10) Patent No.: US 10,466,134 B2
(45) Date of Patent: Nov. 5, 2019

(54) METHODS FOR DETECTING LEAKS IN PIPELINES

(71) Applicant: Naveed Aslam, Houston, TX (US)

(72) Inventor: Naveed Aslam, Houston, TX (US)

(73) Assignee: LINDE AKTIENGESELLSCHAFT (DE)

(*) Notice: Subject to any disclaimer, the term of this patent is extended or adjusted under 35 U.S.C. 154(b) by 321 days.

(21) Appl. No.: 15/384,703

(22) Filed: Dec. 20, 2016

(65) Prior Publication Data

US 2018/0172545 A1  Jun. 21, 2018

(51) Int. Cl.
*G01M 3/22* (2006.01)
*B08B 9/04* (2006.01)

(52) U.S. Cl.
CPC ............... *G01M 3/222* (2013.01); *B08B 9/04* (2013.01)

(58) Field of Classification Search
CPC .................................. G01M 3/22; G01M 3/222
See application file for complete search history.

(56) References Cited

U.S. PATENT DOCUMENTS

| | | | | |
|---|---|---|---|---|
| 3,361,547 A | * | 1/1968 | Packo | ................... B01J 19/002 |
| | | | | 116/206 |
| 2010/0170326 A1 | * | 7/2010 | Miller | ................... G01M 3/227 |
| | | | | 73/49.3 |
| 2012/0252140 A1 | * | 10/2012 | Aimiya | ................... C01B 33/12 |
| | | | | 436/501 |
| 2017/0146501 A1 | * | 5/2017 | Martens | ................ G01N 33/007 |
| 2017/0299108 A1 | * | 10/2017 | Perstnev | ................ B08B 9/055 |

* cited by examiner

*Primary Examiner* — Lisa M Caputo
*Assistant Examiner* — Alex T Devito
(74) *Attorney, Agent, or Firm* — Iurie A. Schwartz

(57) ABSTRACT

A method for detecting leaks in pipelines, particularly those transporting natural gas is disclosed. Leak sensitive particles are added either as soluble particles or in a nitrogen atmosphere which will transmit signals to an appropriate sensor when a leak condition is detected. The sensors can be located along the length of the pipeline or in a pig that will be transported through the pipeline along with the leak sensitive particles.

21 Claims, 7 Drawing Sheets

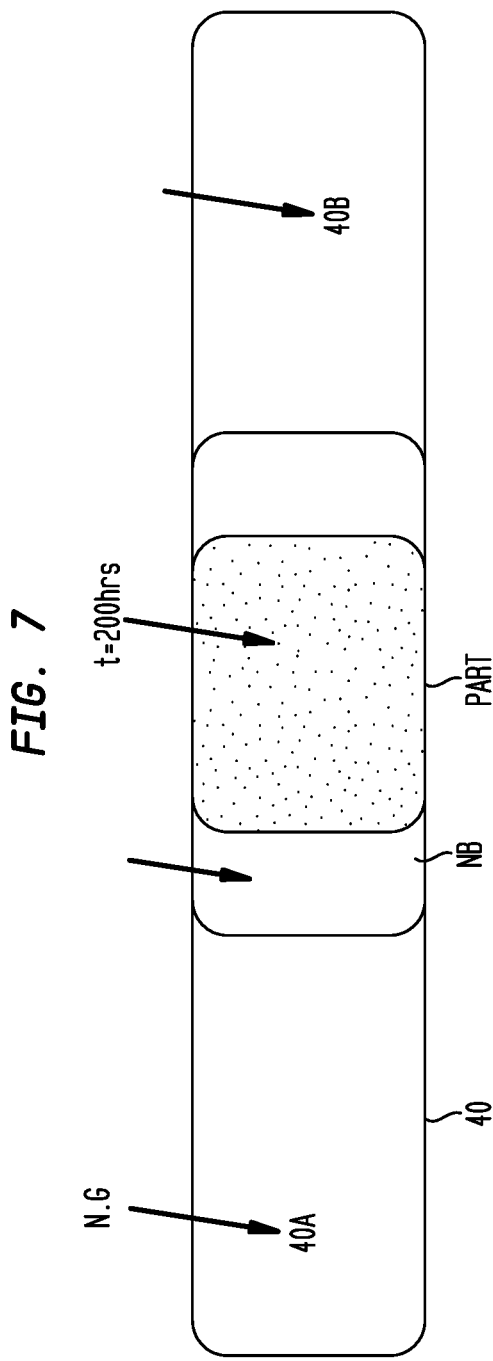

METHODS FOR DETECTING LEAKS IN PIPELINES

BACKGROUND OF THE INVENTION

Natural gas is fast replacing oil and coal as a cleaner and low cost fuel. Particularly after the recent United States shale revolution, natural gas is now a major contributor to the energy landscape in the United States. Notwithstanding this development, the natural gas delivery infrastructure is rapidly aging in the United States.

The US Department of Energy has emphasized that ensuring the reliability of natural gas delivery systems is a critical need for the energy sector. With approximately 650,000 miles of delivery pipelines, efficient means are necessary to ensure the maintenance of these pipelines. A reliable and timely detection of failure of any part of the pipeline is critical to ensure the continued operation of the natural gas pipeline and its infrastructure.

Amongst the methods for inspecting pipelines are those used for detecting leaks in the pipeline. These range from manual inspection using trained dogs to advanced satellite based hyper spectral imaging. The various methods can be classified into non-optical and optical methods. The primary non-optical methods include acoustic monitoring, gas sampling, soil monitoring, flow monitoring and software based dynamic modeling.

Optical methods for leak detection can be classified as either passive or active. Active methods illuminate the area above the pipeline with a laser or a broadband source. The absorption or scattering caused by natural gas molecules above surface is monitored using an array of sensors at specific wavelengths. If there is a significant absorption or scattering above a pipeline, then a leak is presumed to exist. The basic techniques for active monitoring include Tunable Diode Laser Absorption Spectroscopy (TDLAS), Laser Induced Fluorescence (LIF), Coherent Anti-Raman Spectroscopy (CARS), Fourier Transform Infrared Spectroscopy (FTIR) and evanescent sensing.

Passive monitoring of natural gas leaks is similar to active monitoring in many aspects. However, the major difference between active and passive techniques is that passive techniques do not require a source. This makes passive systems less expensive. However, since a strong radiation source is not employed, many more expansive detectors and imagers have to be used with the passive systems. Two major types of passive systems used for monitoring leaks from natural gas pipelines are thermal imaging and multi-wavelength imaging.

The present invention provides for improved leak detection methods in natural gas pipelines.

SUMMARY OF THE INVENTION

In a first embodiment of the invention, there is disclosed a method for detecting leaks in a pipeline, particularly pipelines for transporting natural gas, comprising adding leak sensitive particles to the pipeline.

In a second embodiment of the invention, there is disclosed a method for detecting leaks in a pipeline, particularly pipelines for transporting natural gas, comprising adding leak sensitive particles to the pipeline after a pig has been introduced into the pipeline.

The leak sensitive particles are introduced into the gas stream present in the pipeline in an inert gas bolus. Typically the gas present in the pipeline is natural gas and the inert gas is nitrogen. The particles that are sensitive to leaks are monitored through instruments that are installed at various positions along the length of the gas pipeline.

The nitrogen gas bolus containing the leak sensitive particles will travel through the length of the pipeline. The leak sensitive particles will possess certain optical characteristics that can be measured through the instrumentation detectors and sensors placed along the length of the pipeline. This instrumentation would typically be fiber optic based sensors. When the leak sensitive particles encounter a leak in the pipeline, they will escape from the pipeline and enter the atmosphere. This loss will cause a change in their optical characteristics and signal which is measured by the fiber optic based sensors. Once measured, the fiber optic based sensors will transmit this data through a wireless network to a control center thereby alerting the pipeline operator. The data received will enable the operator to determine the location and relative severity of the leak in the pipeline.

When a pig is employed, it is typically a multifunctional deformable soft pig that can be positioned in front of the nitrogen bolus and receive signals from the leak sensitive particles present in the nitrogen. The pig can serve two functions then, namely, assisting in cleaning deposits off the interior sides of the pipeline and containing receivers and transmitters for receiving data from the leak sensitive particles and transmitting the data to a control center for operator review.

The pig may be made of a deformable core material that is a shape memory effect (SME) polymer foam. Polymers such as polytetrafluoroethylene (PFTE), polylactide (PLA) and ethylene-vinyl acetate (EVA) in combination with other materials which release latent heat of crystallization could be effective SMEs. It is anticipated that a silicone combined with a wax and a salt could produce a hybrid SME which could be a multiple-stimuli responsive SME. For example, utilizing the latent heat generated during the crystallization of salt the polymer hybrid matrix could self-heat for shape change/recovery. The initialization of crystallization in a room temperature liquid could be generated through a gentle disturbance or pressure. A wax could therefore be selected which is brittle at room temperature thus an impact/pressure induced material could be designed.

The pig may also be used as an intelligent pig whereby electronics and sensors that collect various forms of data during its trip through the pipeline. So for example, the deformable foam material may be fitted with sensors or devices for the monitoring of corrosion or pipeline defects; release of corrosion inhibitor; internal pipeline imaging; data transmission; and micro-motion sensor to generate power for the instruments.

The leak sensitive particles are designed particularly for the methods of the present invention. The leak sensitive particles are typically nano-scale in size, ranging from about 100 to 500 nanometers. A functional molecule of organic or inorganic origin will be immobilized or attached to the core of the nano-scale size particle. This core could be silica for example. The attachment or encapsulation of luminescent molecules in or with the silica increases their photostability and emission quantum due to their isolation from possible quenchers. As such, the coupling will provide a bright and stable luminescent entity.

Examples of a luminescent molecule could be silver salts or $Ru(bpy)_3Cl_2$, which can be entrapped in $SiO_2$ or attached to $SiO_2$ NP through a link such as an acrylic or vinyl functionality.

The main function of these leak sensitive particles therefore is that when they are in a nitrogen environment such as that present in a pipeline being tested, they are in the "on"

position. When these leak sensitive particles contact oxygen, as would be encountered in a leak condition, they turn "off". Likewise, the oxygen quenching whether in or outside of the pipeline could also be used to determine if a leak condition is present or should be investigated.

The leak sensitive particles as noted are in the nanometer size range. Therefore, once they are suspended in the nitrogen though injection, they will remain suspended for long periods of time. For example, experimental data has shown that this suspension in a nitrogen medium can be:

500 nm particle (spherical shape) can stay suspended in still nitrogen for 41 hrs.
1000 nm particle for 12 hrs
3000 nm particle for 90 minutes
10,000 nm particle for 8.2 minutes.

These numbers are for stagnant nitrogen so for a flowing stream of nitrogen as provided for by the methods of the present invention will yield even better suspension numbers.

The leak sensitive particles can take the form of an aerosol and can be introduced into the nitrogen bolus either outside the pipeline or nitrogen pulse inside of the pipeline. Preferably the introduction is outside of the pipeline to give the operator greater control. For example, a high pressure nitrogen cylinder at 2000 pounds per square inch (psi) to 3000 psi will have the leak sensitive particles introduced inside of the cylinder through a syringe pump. Given the small size of the particles, they will get well mixed with the nitrogen inside the cylinder and therefore when the nitrogen and particles are introduced into the pipeline, they are a more homogenous mixture.

The bolus of nitrogen and particles can be introduced in a periodic fashion such as weekly thereby allowing the operator to perform frequent leak testing in a low cost manner.

The sensors that are used are typically optical in nature thereby detecting the light sensitive nano particles employed as the leak sensitive particles. These sensors will be operated through a battery and will transmit data through existing supervisory control and data acquisition (SCADA) network systems. Since the SCADA is already installed and used in the operations of the pipelines, there is no additional integration cost so the operator would only be responsible for the cost of the sensors. Typically, these sensors have an excitation element and a detection element. The excitation element operates by shining light on the leak sensitive particles and the detection element will detect the light response. This data acquisition can be recorded and correlated with the state of the pipeline.

The sensors can be situated along the pipeline in a periodic fashion at recurring intervals for example every 10 miles or 30 miles. A longer distance could be employed but would require the operator to then evaluate a longer actual stretch of pipeline to determine the precise location of the leak. The nitrogen bolus could then be 1 mile long for detection purposes.

The leak sensitive particles will move through the pipeline in the nitrogen bolus at roughly the same velocity as that of the pulse applied to the nitrogen bolus notwithstanding the contributions to the velocity through Brownian motion.

BRIEF DESCRIPTION OF THE DRAWINGS

FIG. 7 is a schematic of a natural gas pipeline containing a nitrogen bolus and a more diffuse grouping of leak detection particles.

DETAILED DESCRIPTION OF THE INVENTION

Figure 1:
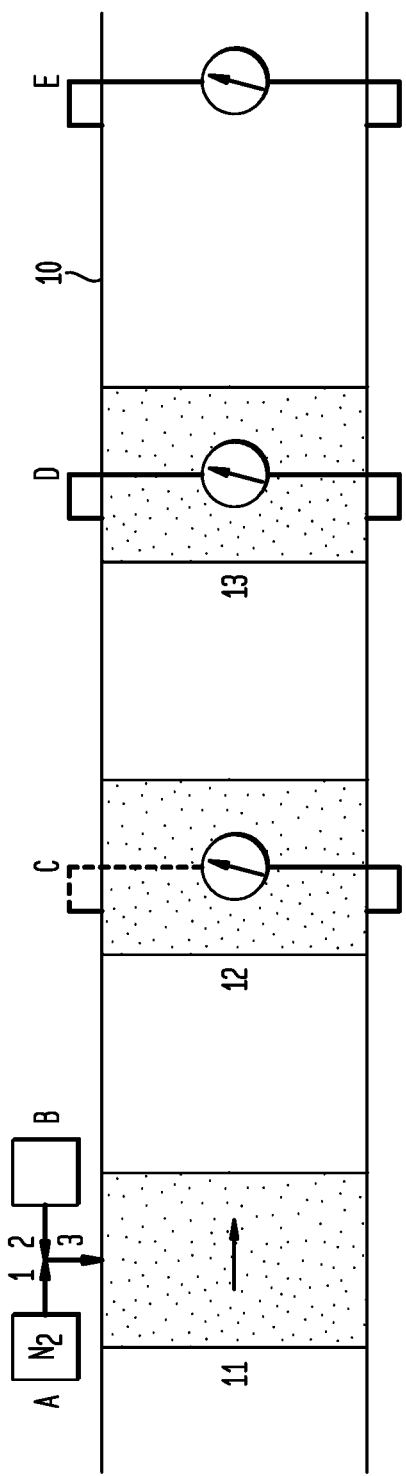
FIG. 1 is a schematic of a natural gas pipeline that is being evaluated for leaks by the methods of the present invention.

FIG. 1 is a schematic representation of a natural gas pipeline that is being evaluated for leaks by the methods of the present invention. A pipeline 10 has natural gas flowing through it from left to right in the figure. The schematic shows a series of nitrogen boluses that are intermittently injected into the natural gas stream. A nitrogen source A and a leak sensitive particle source B feed their components through lines 1 and 2 respectively to converge in line 3. Line 3 thereby feeds a bolus of nitrogen containing the leak sensitive particles into the pipeline 10. These sources will be periodically mixed then to provide at intervals the bolus of nitrogen and leak sensitive particles.

The nitrogen boluses containing the leak sensitive particles are labeled 11, 12 and 13. As these pass through the pipeline 10, they will periodically pass detectors C, D and E which will measure an optical property of the leak sensitive particles. In the situation shown in FIG. 1, there is no leak present so the optical characteristics of the leak sensitive particles will not change and the detectors will report as such to central control. No operator action would then be necessary as no leak condition exists.

Figure 2:
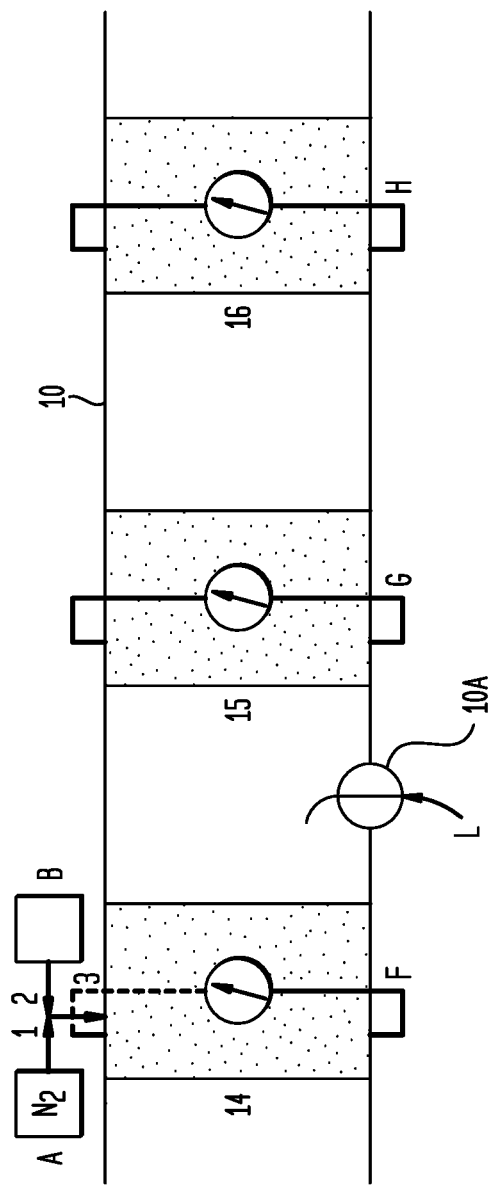
FIG. 2 is a schematic of a natural gas pipeline that is experiencing a leak condition.

However, in FIG. 2 a different situation is encountered. Like named operations or components will bear the same designations as those in FIG. 1. A pipeline 10 containing natural gas is passing from left to right. A nitrogen source A and a leak sensitive particle source B feed their components through lines 1 and 2 respectively to converge in line 3. Line 3 thereby feeds a bolus of nitrogen containing the leak sensitive particles into the pipeline 10.

The boluses of nitrogen containing the leak sensitive particles are shown as 14, 15 and 16 in pipeline 10. These boluses will pass detectors F, G and H which will receive information from the leak sensitive particles noting if a change in optical characteristics is present as a bolus passes by the detectors.

As noted in FIG. 2, a leak 10A is present in the pipeline 10. The leak will allow an amount of leak sensitive particles to exit the pipeline 10 and leave the nitrogen environment they are present in the pipeline. The leak sensitive particles upon leaving the pipeline will now be exposed to the atmosphere and hence oxygen as a component of air. This will cause the leak sensitive particles to alter their optical characteristics which will cause them to transmit a signal. This signal will be detected by either detector F or G which will then transmit this data to central control where an operator will be alerted that a leak condition exists at 10A in pipeline 10.

Figure 3:
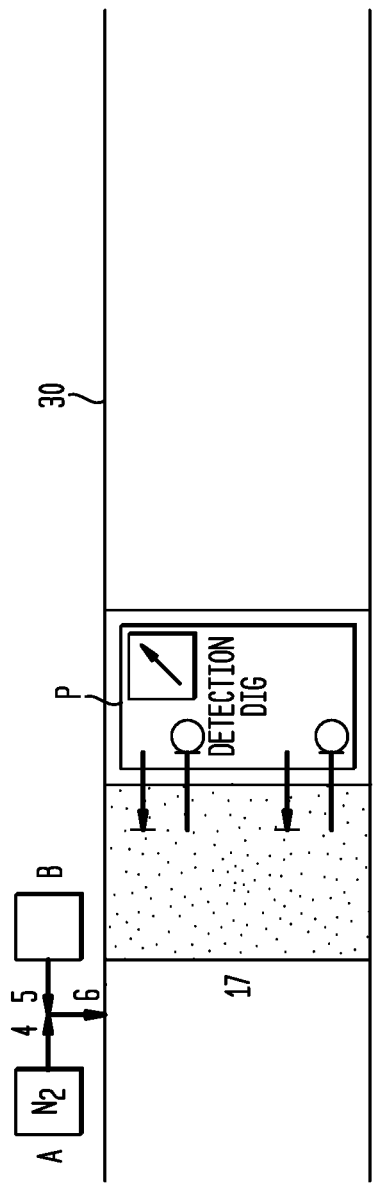
FIG. 3 is a schematic of a natural gas pipeline that is being evaluated for leaks by a pig according to the invention.

FIG. 3 is a schematic of a leak detection method of the present invention wherein a pig is used ahead of the bolus of nitrogen and leak sensitive particles. A pipeline 30 contains natural gas flowing from left to right. A source of nitrogen A feeds from line 4 to line 6. A source of leak sensitive particles B provides these particles through line 5 to line 6 where they will mix with the nitrogen. The bolus of nitrogen and leak sensitive particles is then introduced into pipeline 30 as 17.

Directly ahead of the bolus 17 is a soft deformable pig P. The soft deformable pig P will be multifunctional in that it will operate to remove contaminants that are built up on the interior walls of the pipeline 30 but also contain sensors that can receive signals. The bolus of nitrogen would contain the leak sensitive particles. When the leak sensitive particles encounter a leak in the walls of the pipeline, they would leak into the atmosphere where they would encounter oxygen. This would change their optical characteristics and the particles would transmit a signal as such. In the embodiment of FIG. 3, the soft deformable pig would receive the signal and relay that to central control where an operator would be alerted to a leak condition and its location and relative severity. As noted above, the pig may contain additional electronics and sensors that could be used to collect various forms of data during its trip through the pipeline including those for monitoring corrosion or pipeline defects or internal imaging of pipeline walls.

Figure 4:
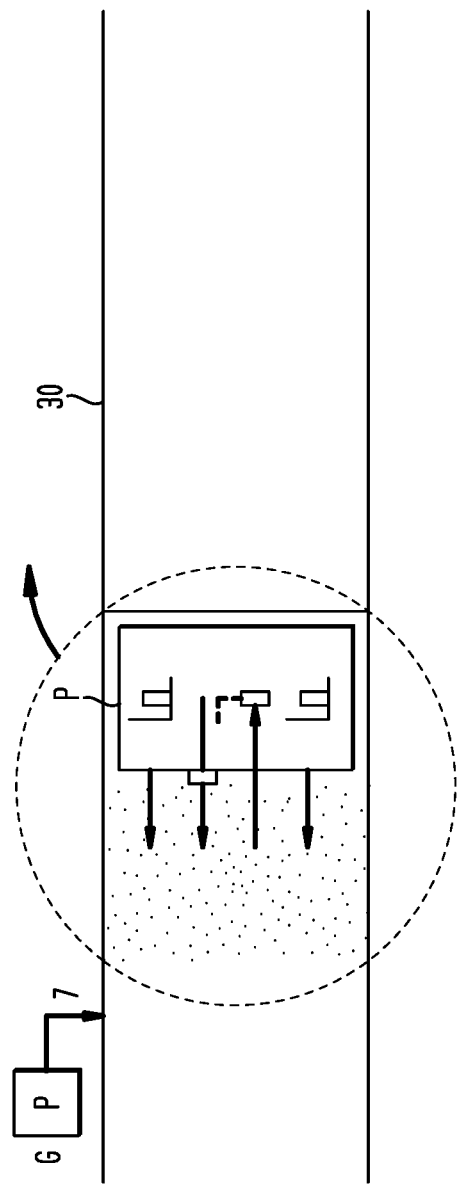
FIG. 4 is a schematic of a natural gas pipeline that is being evaluated directly in the natural gas.

In FIG. 4, a soft deformable pig is also employed in pipeline 30. Natural gas is moving from the left to the right in the pipeline 30. In this embodiment, leak sensitive particles are fed from source G through line 7 into pipeline 30. These leak sensitive particles are soluble in the natural gas that is passing through the pipeline 30, therefore no nitrogen bolus is necessary to provide them an environment in which to travel within the pipeline.

A pig P may be a soft deformable pig which will pass through the pipeline 30 ahead of the concentration of soluble leak sensitive particles. This pig P will contain sensors and electronics primarily of which is to receive signals from the soluble leak sensitive particles as the combination of the concentration of particles and pig passes through the pipeline. As in the other embodiments, the leak sensitive particles will transmit one signal until they encounter a situation where they encounter something different. In the case then a leak would allow them to exit the pipeline where they will contact air. This will cause the particles to switch their optical characteristics thereby sending a signal to the sensors in the pig that a leak condition has been encountered. The pig would receive the signal and relay that to central control where an operator would be alerted to a leak condition and its location and relative severity.

Figure 5:
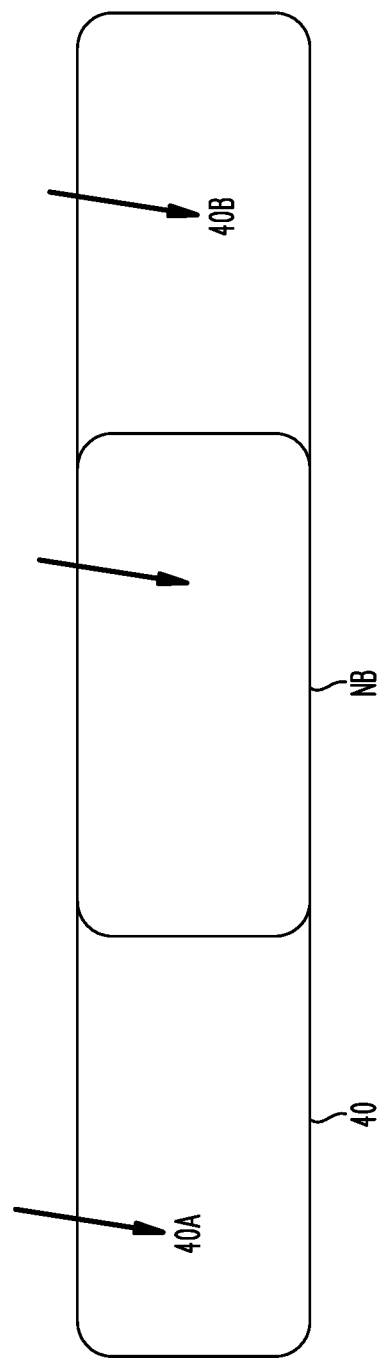
FIG. 5 is a schematic of a natural gas pipeline containing a nitrogen bolus.

An inert nitrogen gas medium is particularly suited for containing the leak detection particles in the gas pipeline that is being examined. In FIG. 5, a nitrogen bolus, NB, is shown in pipeline 40. The nitrogen bolus NB is shown as a separate section of the continuum of natural gas present in the pipeline, namely 40A and 40B respectively.

Figure 6:
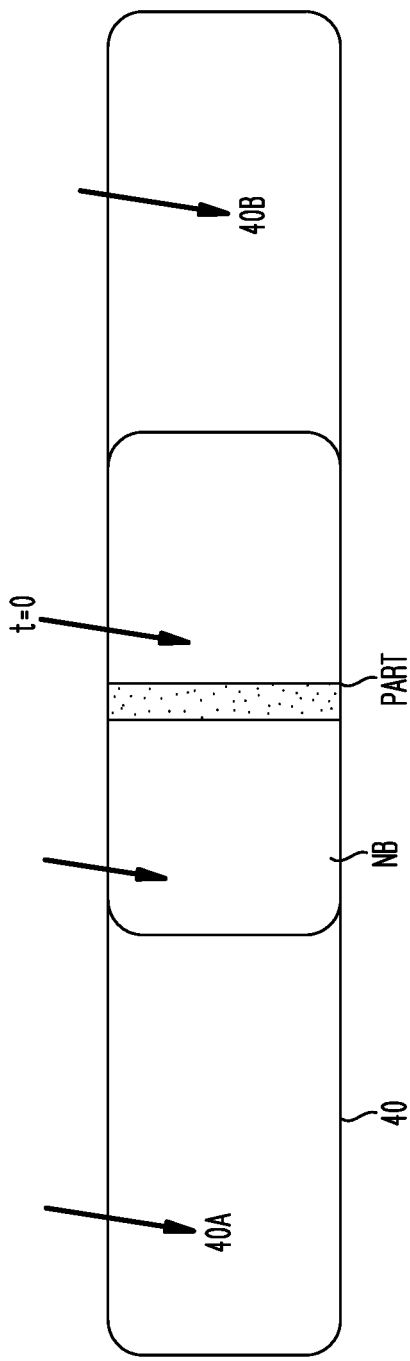
FIG. 6 is a schematic of a natural gas pipeline containing a nitrogen bolus and leak detection particles.

As shown in FIG. 6, the same designations are used as FIG. 5, to show the natural gas and nitrogen bolus. This figure represents the situation where the leak detection particles, Part, are added to the nitrogen bolus. As stated in the operation of the invention, the leak sensitive particles will be in their on position when solely in the nitrogen atmosphere. When they encounter oxygen coming from a leak, they turn to the off position and transmit the relevant signal to the sensors which relay that data to a central control room.

If the leak detection particles diffuse out of the nitrogen bolus and into the natural gas through either end of the bolus, there could be concerns with false reads or accuracy of the data so received. To assist in alleviating this concern, the leak detection particles, Part, are added at time equal to zero to the middle of the nitrogen bolus NB.

In FIG. 7, the same designations are employed as in FIGS. 5 and 6 to represent the natural gas, nitrogen bolus, pipeline and leak detection particles. It can be seen that after 200 hours in the nitrogen bolus in the pipeline that the leak detection particles Part have expanded their position in the nitrogen bolus NB but are still well within the physical confines of the nitrogen bolus NB and have not started diffusing into the natural gas either in front of or behind (40A and 40B) the nitrogen bolus NB.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what I claim is:

1. A method for detecting leaks in a pipeline comprising adding leak sensitive particles comprising a silica core surrounded by luminescent molecules wherein the luminescent molecules are selected from the group consisting of silver salts and Ru(bpy)$_3$Cl$_2$ and the leak sensitive particles will change signals when a leak is detected in the pipeline wherein the signal change is detected by an optical sensor and optical sensors are mounted on the pipeline at recurring intervals to the pipeline.

2. The method as claimed in claim 1 wherein the pipeline is for transporting natural gas.

3. The method as claimed in claim 1 wherein the leak sensitive particles are added to the pipeline in an inert gas bolus.

4. The method as claimed in claim 3 wherein the inert gas bolus is a nitrogen bolus.

5. The method as claimed in claim 4 wherein the leak sensitive particles are added to the nitrogen bolus as an aerosol.

6. The method as claimed in claim 5 wherein the leak sensitive particles are mixed with nitrogen in a nitrogen cylinder before introduction into the pipeline.

7. The method as claimed in claim 1 wherein the leak sensitive particles range from 100 to 500 nanometers in diameter.

8. A method for detecting leaks in a pipeline comprising adding leak sensitive particles to the pipeline after a pig has been introduced into the pipeline, wherein the pig contains receivers and transmitters for receiving data from the leak sensitive particles and transmitting the data to a control center, wherein the receivers are selected from the group of sensors consisting of monitoring corrosion, release of corrosion inhibitor, pipeline imaging, data transmission and micro-motion, and the leak sensitive particles comprise a silica core surrounded by luminescent molecules wherein the luminescent molecules are selected from the group consisting of silver salts and Ru(bpy)$_3$Cl$_2$.

9. The method as claimed in claim 8 wherein the pig is a deformable soft pig.

10. The method as claimed in claim 8 wherein the pig cleans deposits from the inside of the pipeline.

11. The method as claimed in claim 8 wherein the pig is made of a deformable core material.

12. The method as claimed in claim 11 wherein the deformable core material is a shape memory effect polymer selected from the group consisting of polytetrafluoroethylene, polylactide and ethylene-vinyl acetate.

13. The method as claimed in claim 8 wherein the pipeline is for transporting natural gas.

14. The method as claimed in claim 8 wherein the leak sensitive particles are added to the pipeline in an inert gas bolus.

15. The method as claimed in claim 14 wherein the inert gas bolus is a nitrogen bolus.

16. The method as claimed in claim 8 wherein the leak sensitive particles range from 100 to 500 nanometers in diameter.

17. The method as claimed in claim 8 wherein the leak sensitive particles will change signals when a leak is detected in the pipeline.

18. The method as claimed in claim 17 wherein the leak sensitive particles are added to the nitrogen bolus as an aerosol.

19. The method as claimed in claim 18 wherein the leak sensitive particles are mixed with nitrogen in a nitrogen cylinder before introduction into the pipeline.

20. The method as claimed in claim 17 wherein the signal change of the leak sensitive particles is detected by an optical sensor.

21. The method as claimed in claim 20 wherein the optical sensors are mounted on the pipeline at recurring intervals.

\* \* \* \* \*